US011347570B1

(12) United States Patent
Hsu et al.

(10) Patent No.: US 11,347,570 B1
(45) Date of Patent: May 31, 2022

(54) SYSTEM AND METHOD FOR BIOS BASED MESSAGING IN AN INFORMATION HANDLING SYSTEM

(71) Applicant: DELL PRODUCTS, LP, Round Rock, TX (US)

(72) Inventors: Shun-Tang Hsu, Taipei (TW); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/183,020

(22) Filed: Feb. 23, 2021

(51) Int. Cl.
  *G06F 9/54* (2006.01)
  *G06F 8/654* (2018.01)

(52) U.S. Cl.
  CPC .............. *G06F 9/542* (2013.01); *G06F 8/654* (2018.02)

(58) Field of Classification Search
  CPC .......... G06F 9/4812; G06F 9/54; G06F 9/542; G06F 9/544; G06F 9/546; H04L 29/06
  USPC .................................................. 719/313, 318
  See application file for complete search history.

(56) References Cited

U.S. PATENT DOCUMENTS

| 7,356,683 | B2 | 4/2008 | Hsu | |
|---|---|---|---|---|
| 2010/0306357 | A1 | 12/2010 | Chen | |
| 2021/0271537 | A1* | 9/2021 | Gong | ................... G06F 11/0787 |
| 2021/0297330 | A1* | 9/2021 | Li | ........................... H04L 41/28 |

* cited by examiner

*Primary Examiner* — Andy Ho
(74) *Attorney, Agent, or Firm* — Larson Newman, LLP

(57) ABSTRACT

An information handling system includes a message application, a system BIOS, and a storage device. The message application receives event identifiers based upon events received from devices of the information handling system. The system BIOS includes a first message table having a plurality of first entries, each first entry including a first event identifier and an associated first event message. The storage device includes a second message table having a plurality of second entries, each second entry including a second event identifier and an associated second event message. The message system receives a third event identifier from a particular device, determines that the third event identifier corresponds to a first entry in the first message table, displays the associated first event message, determines that the third event identifier corresponds with a second entry in the second message table, and displays the associated second event message.

19 Claims, 4 Drawing Sheets

SYSTEM AND METHOD FOR BIOS BASED MESSAGING IN AN INFORMATION HANDLING SYSTEM

FIELD OF THE DISCLOSURE

This disclosure generally relates to information handling systems, and more particularly relates to providing BIOS based messaging in an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a message application, a system BIOS, and a storage device. The message application may receive event identifiers based upon events received from devices of the information handling system. The system BIOS may include a first message table having a plurality of first entries, each first entry including a first event identifier and an associated first event message. The storage device may include a second message table having a plurality of second entries, each second entry including a second event identifier and an associated second event message. The message system may receive a third event identifier from a particular device, determine that the third event identifier corresponds to a first entry in the first message table, display the associated first event message, determine that the third event identifier corresponds with a second entry in the second message table, and display the associated second event message.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
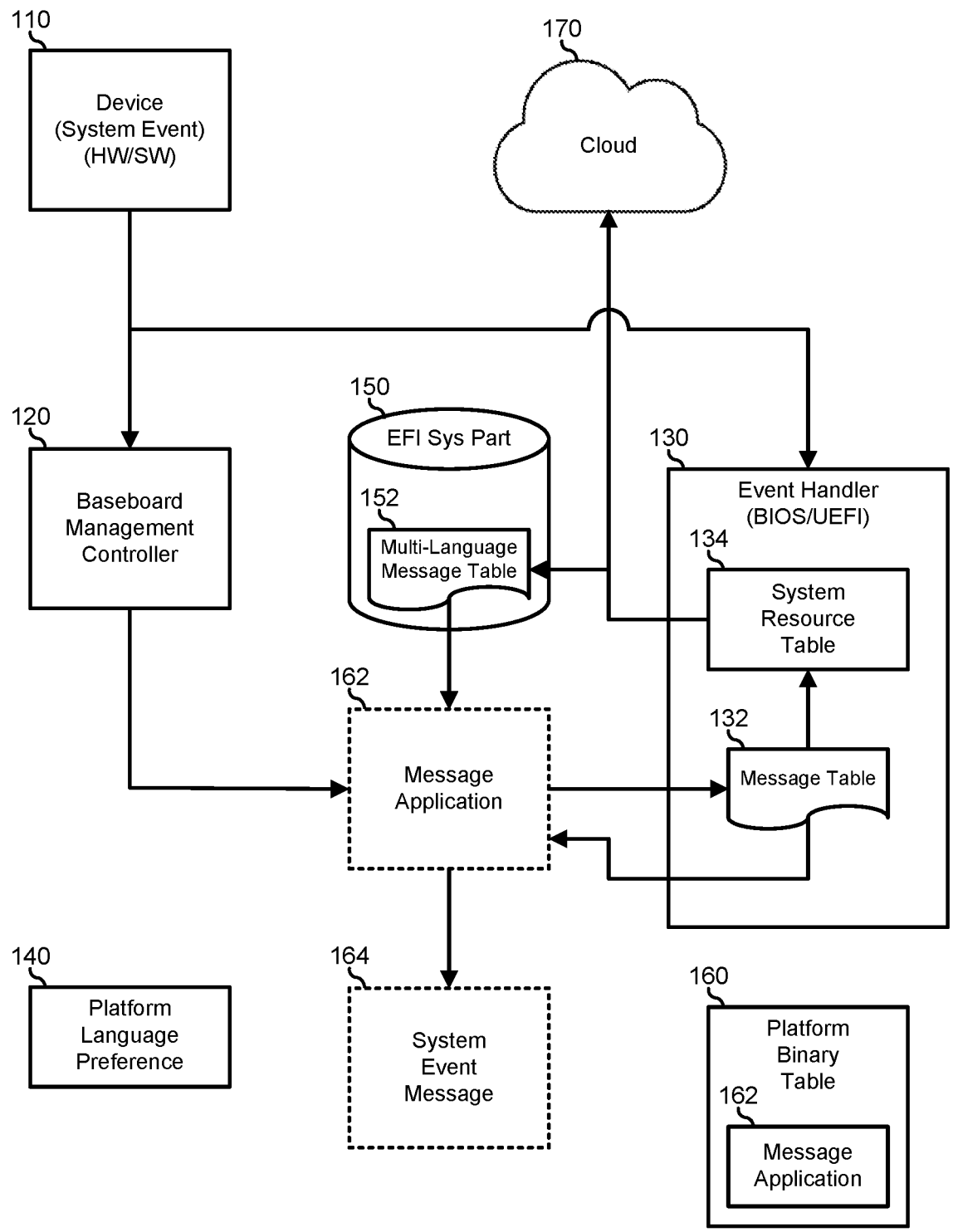
FIG. 1 is a block diagram illustrating an information handling system according to an embodiment of the current disclosure.

FIG. 1 illustrates an information handling system 100 including a device 110, an baseboard management controller (BMC) 120, an event handler 130, a platform language preference setting 140, a storage device 150, a platform binary table 160, and a cloud network 1670. Device 110 represents any source of system events that are provided to one or more of BMC 120 and event handler 130, and that are typically reported to a user or administrator of the information handling system or are otherwise reported, recorded, or logged on the information handing system, as needed or desired. Events may be understood to include failure indications, warnings, status change indications, messages, or the like. Here, the events provided by device 110 may be provided as hardware events provided by one or more component of information handing system 100, including dedicated circuit signals, interrupts, or the like. The events provided by device 110 may also be provided as software events, such as software interrupts, driver events, firmware events, or the like. As such, device 110 may represent hardware devices, software services or procedures, firmware services or procedures, or the like.

BMC 120 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. BMC 120 operates to receive events from device 110 in order to offload a processor of information handling system 100 from having to receive and process events from the device. Here, BMC 120 provides a pre-filtering of the events from device 110 to determine whether or not a particular event is associated with an event message that is to be addressed by a message application 162 instantiated within platform binary table 160, as described below.

Event handler 130 represents one or more elements of information handling system 100 that are configured to provide event handling services in response to the events provided by device 110. An example of event handler 130 may include a Basic Input/Output System or Universal Extensible Firmware Interface (BIOS/UEFI) or operating system (OS) instantiated on information handing system 100, a processor, an I/O hub or chipset component configured to receive hardware or software events, an error logger, System Management Mode (SMM) firmware invoked on the information handling system in response to a System Management Interrupt (SMI), or any other element of the information handling system that is configured to receive event information from device 110. In particular, event handler 130 may be understood to include any device included in information handling system 100, or any agent instantiated in the information handling system, that is configured to provide event messages to a user or administrator of the information handling system, to report generators, message recorders, message logs, and the like, as needed or desired. In the illustrated embodiment, event handler 130 represents a BIOS/UEFI, and the functions and features of the event handler will be described in the context of a BIOS/UEFI. However, it should be understood that the teachings of the current disclosure may be applied to other elements that operate as an event handler, as needed or desired. Event handler 130 includes a message table 132 and a system resource table 134, as described further below.

Platform language preference setting 140 represents a configuration setting instantiated on information handling system 100 that operates to set a language preference for the operations of the information handling system. As such, platform language preference setting 140 may include a non-volatile storage such as a BIOS setting, an OS load option, or the like that can be referenced when various communications provided by information handling system 100 are to be given. Here, each of the various communications may be provided on information handling system 100 in multiple languages, and the messaging agent may refer to a platform language preference setting 140 to select a version of the various communications that are in the associated language, as described further below.

Storage device 150 represents a non-volatile storage device that is utilized by various elements of information handling system 100. In particular, storage device 100 may represent an EFI system partition that stores information utilized by a BIOS/UEFI, and that may require more data storage space than is typically associated with a BIOS flash used to store the operating code of the BIOS/UEFI. Storage device 150 includes a multi-language message table 152, described further below. Platform binary table 160 represents a table that enables system boot firmware to provide an OS with a platform binary that the OS can execute. The binary handoff medium may typically be physical memory, allowing the system boot firmware to proved the platform binary to be provided without having to modify the OS image on a disk. An example of platform binary table 160 includes a Windows Platform Binary Table (WPBT) that is a fixed table within the Advanced Configuration and Power Interface (ACPI) framework. Here, message application 162 represents a particular platform binary instantiated in platform binary table 160. Cloud network 170 represents resources available to be accessed by information handling system 100 and that are separate from the information handling system, as described further below.

The inventors of the current disclosure have understood that current event handlers, such as OS event handlers or event handling software, being instantiated in platform software, may not be consistently expected to be loaded into the information handling system, such as where a particular device may operate satisfactorily with generic drivers and service, but where additional features may be supported only in the associated software. As such, changes to the event handlers may not be timely updated to provide the most up to date messages without carefully managing software updates. For example, where the messages associated with a particular device may change rapidly, it may be deemed unimportant to spin a new software revision for each change, but multiple changes may be collected for distribution in a future software revision. Thus managing message changes within a BIOS/UEFI or SMI handler may be desirable, because firmware updates may be managed via a system update mechanism provided by the manufacturer of the information handling system or the system BIOS/UEFI.

However even with message handlers that are provided by a platform BIOS/UEFI or SMI handler, the platform BIOS/UEFI or SMI handler may typically include event messages for a limited number of event types due to the limited amount of storage provided by a BIOS flash device, and that, in any case, the amount of code associated with the core features of the BIOS/UEFI typically leaves little capacity for providing robust event messaging. This is particularly true where event messages are associated with rare events, such as where the events are associated with a unique platform architecture, a seldom utilized feature, a specialized element of add-in hardware, or the like. Moreover, even where a particular event message may be provided within the bounds of the BIOS code, such code seldom provides for multi-language messaging.

In a particular embodiment, when device 110 experiences an event, the device provides the associated event signal to one or more of BMC 120 and event handler 130. As noted above, an event may include a hardware event, a software event, a firmware event, or the like, and the event signal can be provided to BMC 120 or event handler 130 via a hardware signal, a software signal, or the like. Here, the receiving agent (e.g., BMC 120 or event handler 130) operates to determine event information associated with the event and to provide the event information to message application 162. For example, the receiving agent may receive the event information with the event, or may provide the event information based upon the received event signal. The event information may include an event identifier that is uniquely associated with the event. For example, the receiving agent may receive a hardware signal indicative of an event occurrence on device 110, and the receiving agent may be configured to ascribe a particular event identifier to the receipt of the hardware signal. In another example, the receiving agent may receive a software event signal from device 110 that includes the event identification.

Message application 162 receives the event information and provides the associated event identifier to message table 132. Message table 132 include multiple event entries. Each event entry includes an event identifier, and an associated message, typically provided in a preferred base language, such as in English. It will be understood that, as in the illustrated case where message table 132 is included in a system BIOS/UEFI, the storage capacity within a BIOS ROM may be limited, and so the number and character of message entries stored in message table may be limited, representing a subset of the most commonly utilized messages in the preferred base language. Here, when message application 162 provides the event identifier to message table 132, the message application further determines the contents of platform preferred language setting 140. Then, if message table 132 includes an entry associated with the received event identifier, and the associated message is in the preferred language as indicated by the platform preferred language setting 140, the message table provides the associated message to message application 162, and the message application broadcasts the base language message as the system event message 164. An example of system event message 164 may include a pop-up message on a display of information handling system 100, an entry in an error log, an indication to a datacenter management system via BMC 120, or another form of system event messaging, as needed or desired. here, it will be understood that message application 162 may operate in conjunction with other messaging systems within a platform BIOS/UEFI, an OS, a management environment, a SMM, or the like, as needed or desired. The particular details of providing system event messages are known in the art and will not be further described herein, except as needed to illustrate the current embodiments.

If message table 132 does not include an entry associated with the received event identifier, or if the message table include an entry associate with the received event identifier, but the associated message is not provided in the preferred system language, the message table provides the event identifier to system resource table 134 to access multi-language message table 152 on storage device 150 to retrieve the associated message for display by message application 162, and the message application broadcasts the preferred language message as the system event message 164. Here, it will be understood that, because multi-language message table 152 resides on storage device 150, the capacity of the multi-language message table will be much greater than that of message table 132. As such, multi-language message table 152 will be understood to include a wider range of messages for a greater number of event identifiers, to include multiple language options for the received event identifiers, and to further include multiple language options for the base language messages in message table 132.

If multi-language message table 152 does not include a message associated with a particular message identifier, message application 162 operates to retrieve the associated message in the base language and to broadcast the base language message as the system event message 164. If multi-language message table 152 does not include an entry associated with the received event identifier, message application 162 broadcasts a generic warning message as the system event message 164. In a particular embodiment, message table 132 may include entries with message identifiers but without associated messages. Here, such an entry may provide a pointer to multi-language message table 152 for the associated message.

Figure 2:
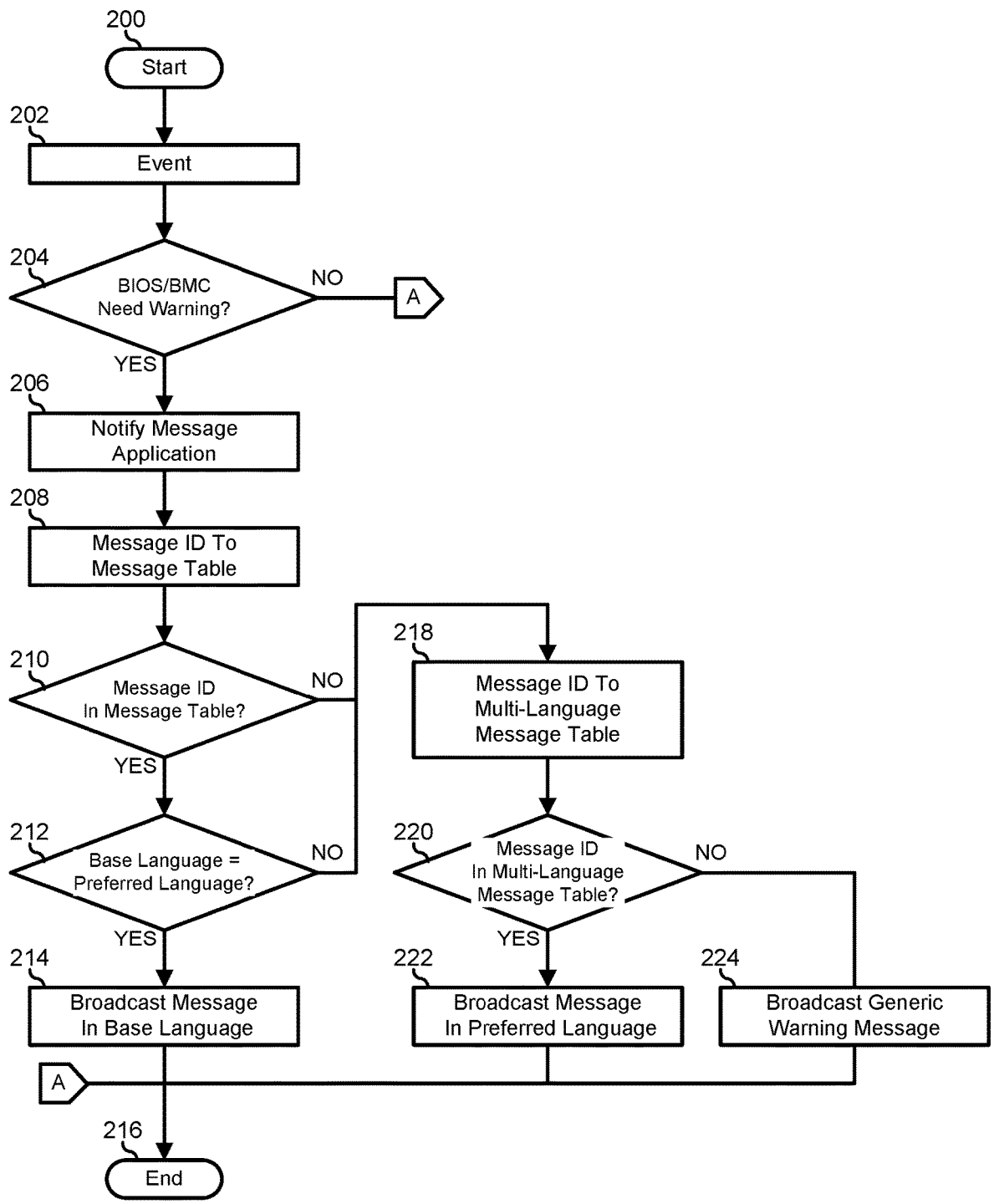
FIG. 2 is a flowchart illustrating a method for providing BIOS based messaging according to an embodiment of the current disclosure.

FIG. 2 illustrates a method for providing BIOS based messaging, starting at block 200. An event is received in block 202, and a decision is made as to whether or not the system BIOS or BMC needs to receive a warning based upon the event in decision block 204. If not, the "NO" branch of decision block 204 is taken and the method ends in block 216. If the system BIOS or BMC needs to receive the warning, the "YES" branch of decision block 204 is taken and a message application is notified of the event with the event identifier in block 206. The message identifier is provided to a message table in block 208, and a decision is made as to whether or not the message identifier is in the message table in decision block 210. If not, the "NO" branch of decision block 210 is taken and the message proceeds to block 218 as described below. If the message identifier is in the message table, the "YES" branch of decision block 210 is taken, and a decision is made as to whether or not the base language of the information handling system is the same as the preferred language setting for the information handling system in decision block 212. If not, the "NO" branch of decision block 212 is taken and the message proceeds to block 218 as described below. If the base language of the information handling system is the same as the preferred language setting for the information handling system, the "YES" branch of decision block 212 is taken, the message associated with the message identifier is broadcast in the base language in block 214, and the method ends in block 216.

If the message identifier is not in the message table and the "NO" branch of decision block 210 is taken, or if the base language of the information handling system is not the same as the preferred language setting for the information handling system and the "NO" branch of decision block 212 is taken, the message identifier is provided to a multi-language message table in block 218. A decision is made as to whether or not the message identifier is in the multi-language message table in decision block 220. If so, the message associated with the message identifier is broadcast in the preferred language in block 222 and the method ends in block 216. If the message identifier is not in the multi-language message table, the "NO" branch of decision block 220 is taken, a generic warning message is broadcast in block 224, and the method ends in block 216.

Figure 3:
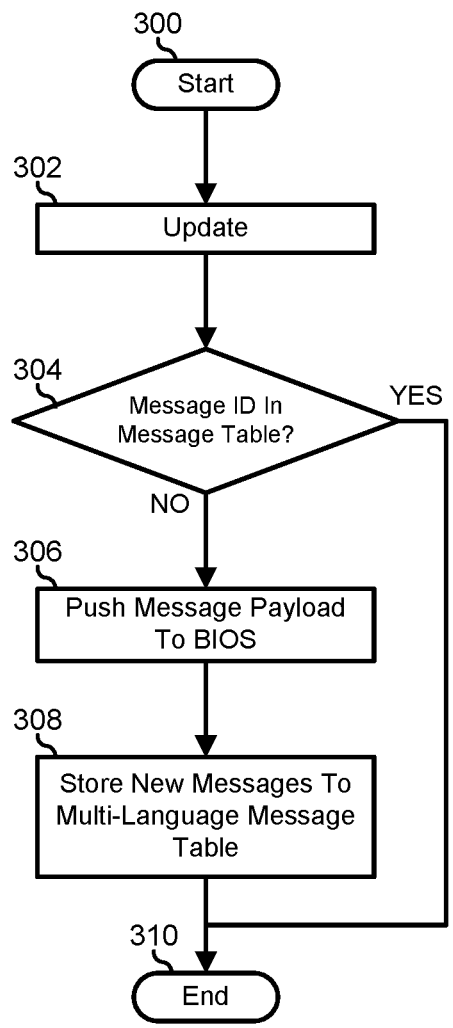
FIG. 3 is a flowchart illustrating a method for updating a messaging system according to an embodiment of the current disclosure.

FIG. 3 illustrates a method for updating a messaging system starting at block 300. An update is received on an information handling system in block 302. In a particular embodiment, the information handling system receives a Windows Update. Here, it will be understood that a system BIOS/UEFI or SMM code may include a message table similar to message table 132. However, it will be further understood that any message table incorporated within a system BIOS/UEFI or SMM code will have a limited number of common messages in a base language, and thus such messages will be rarely updated. Here, updates to such messages in a system BIOS/UEFI or SMM code would necessarily be updated via a firmware update process as may be known in the art. On the other hand, an update for an information handling system, as provided in block 302, will be understood to happen more frequently than a system BIOS/UEFO or SMM code update. For example, a typical OS update may be provided for security patches or other errata fixes on a routine- or as-needed-basis. Thus, the update as provided in block 302 can be readily adapted to provide new messages or new languages much more flexibly than when relying on system BIOS/UEFI or SMM code updates, in part because a multi-language message table as described above may reside on a storage device, and may not necessitate the special handling typically associated with a system BIOS/UEFI or SMM code update, including flashing of a BIOS ROM device, and the like.

A decision is made as to whether or not message identifiers in the update are included in the message table of the message handler in decision block 304. If so, the "YES" branch of decision block 304 is taken and the method ends in block 310. If message identifiers in the update are not included in the message table of the message handler, the "NO" branch of decision block 304 is taken and the message payload is pushed to the message handler (e.g., the system BIOS/UEFI) in block 306, the new message payload is stored the multi-language message table in block 308, and the method ends in block 310.

Figure 4:
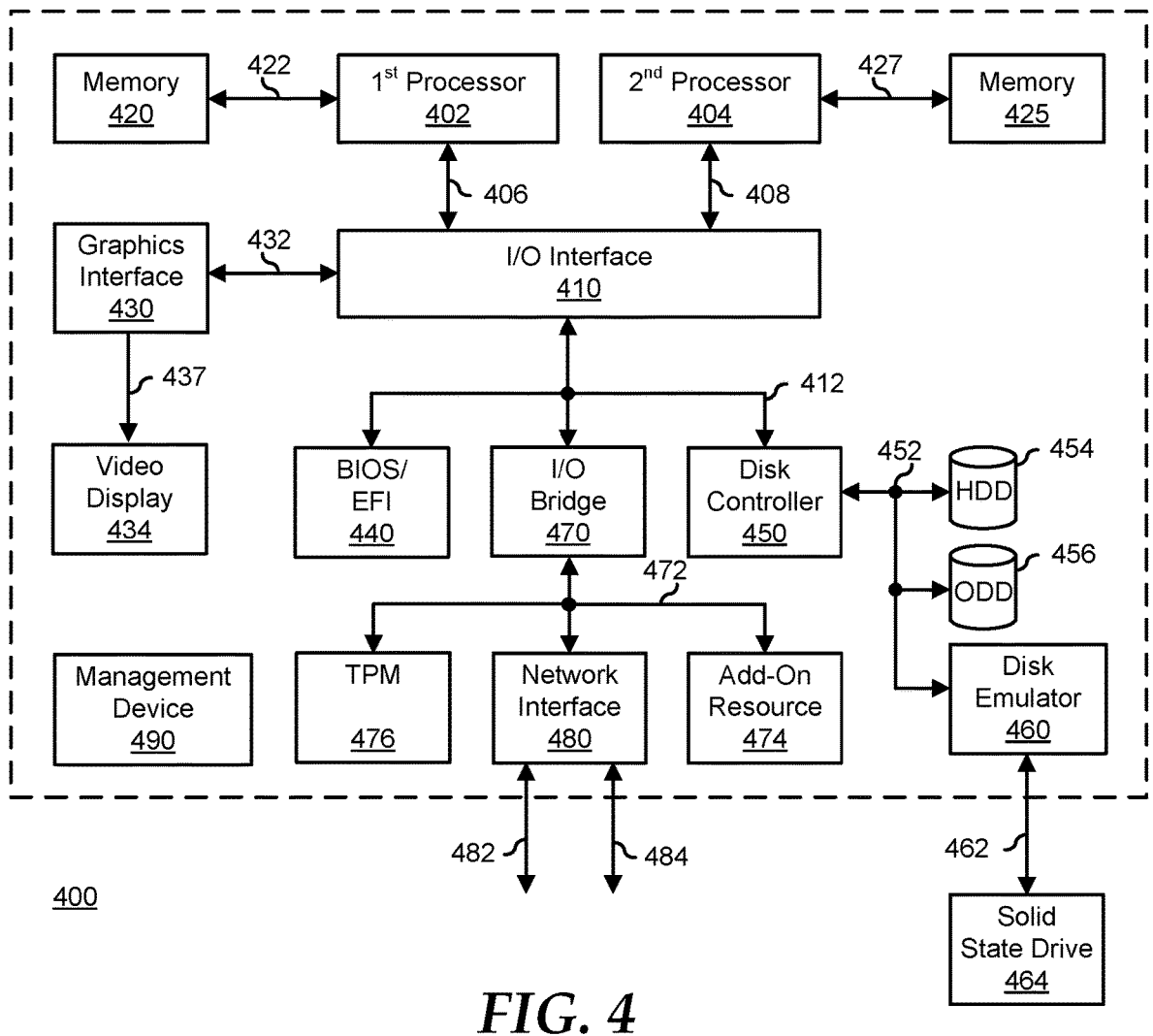
FIG. 4 is a block diagram illustrating a generalized information handling system according to another embodiment of the current disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a message application configured to receive event identifiers based upon events received from devices of the information handling system;
    a system basic input/output system (BIOS) including a first message table having a plurality of first entries, each first entry including a first event identifier and an associated first event message; and
    a storage device including a second message table having a plurality of second entries, each second entry including a second event identifier and an associated second event message;
    wherein the message application is further configured to:
        receive a third event identifier from a particular device;
        determine that the third event identifier corresponds to a first entry in the first message table;
        display the associated first event message;
        determine that the third event identifier corresponds with a second entry in the second message table; and
        display the associated second event message.

2. The information handling system of claim 1, wherein each associated first event message is provided in a core language for the information handling system.

3. The information handling system of claim 2, further comprising:
    a preferred language setting, the preferred language setting indicating a preferred language for the information handling system, the preferred language being different from the core language.

4. The information handling system of claim 3, wherein each associated first event message is not provided in the preferred language.

5. The information handling system of claim 4, wherein each associated second event message is provided in the preferred language.

6. The information handling system of claim 5, wherein the message application is further configured to:
    determine that the preferred language is different from the core language.

7. The information handling system of claim 1, wherein the message application is further configured to:
    determine that the third event identifier does not correspond with any first entry in the first message table or with any second entry in the second message table; and
    display a generic message that an unknown event was received.

8. The information handling system of claim 1, wherein the information handling system is configured to:
    receive a first message update including a first update to the first message table;
    perform a BIOS flash to incorporate the first message update;
    receive a second message update including a second update to the second message table; and
    perform an operating system update to incorporate the second message update.

9. The information handling system of claim 1, further comprising:
    a platform binary table, wherein the message application is a platform binary instantiated in the platform binary table.

10. The information handling system of claim 9, wherein the platform binary table is a Windows Platform Binary Table instantiated in an Advanced Configuration and Power Interface (ACPI) framework of the information handling system.

11. A method, comprising:
    providing, in a system basic input/output system (BIOS) of an information handling system, a first message table having a plurality of first entries, each first entry including a first event identifier and an associated first event message; and storing a second message table having a plurality of second entries, each second entry including a second event identifier and an associated second event message;

receiving a third event identifier based upon an event received from a device of the information handling system;

determining that the third event identifier corresponds to a first entry in the first message table;

displaying the associated first event message;

determining that the third event identifier corresponds with a second entry in the second message table; and displaying the associated second event message.

12. The method of claim 11, wherein each associated first event message is provided in a core language for the information handling system.

13. The method of claim 12, further comprising determining, from a preferred language setting of the information handling system, a preferred language for the information handling system, the preferred language being different from the core language.

14. The method of claim 13, wherein each associated first event message is not provided in the preferred language.

15. The method of claim 14, wherein each associated second event message is provided in the preferred language.

16. The method of claim 15, further comprising determining that the preferred language is different from the core language.

17. The method of claim 11, further comprising:
determining that the third event identifier does not correspond with any first entry in the first message table or with any second entry in the second message table; and
displaying a generic message that an unknown event was received.

18. The method of claim 11, further comprising:
receiving a first message update including a first update to the first message table;
performing a BIOS flash to incorporate the first message update;
receiving a second message update including a second update to the second message table; and
performing an operating system update to incorporate the second message update.

19. An information handling system, comprising:
a baseboard management controller (BMC) configured to receive event signals for devices of the information handling system and to determine event identifiers based upon the event signals;
a message application configured to receive the event identifiers;
a system basic input/output system (BIOS) including a first message table having a plurality of first entries, each first entry including a first event identifier and an associated first event message; and
a storage device including a second message table having a plurality of second entries, each second entry including a second event identifier and an associated second event message;
wherein the message application is further configured to:
receive a third event identifier from a particular device;
determine that the third event identifier corresponds to a first entry in the first message table;
display the associated first event message;
determine that the third event identifier corresponds with a second entry in the second message table; and
display the associated second event message.

* * * * *